Dec. 14, 1926. 1,611,011
L. E. FERGUSON
SHOE DRILL
Filed July 3, 1925

Luther E. Ferguson,
INVENTOR
BY Victor J. Evans,
ATTORNEY

WITNESS:

Patented Dec. 14, 1926.

1,611,011

UNITED STATES PATENT OFFICE.

LUTHER E. FERGUSON, OF NEAR WHITE PIGEON, LA GRANGE COUNTY, INDIANA.

SHOE DRILL.

Application filed July 3, 1925. Serial No. 41,301.

My present invention has reference to an attachment for grain shoe drills, and has among its objects the provision of means on the drill shoes for gauging the depth of the shoes in the soil, to smooth and compress the soil forward of the furrow made by the shoes, and thereby insure the seed being planted to the proper depth, prevent the spreading of the seed and providing ridges of soil on the opposite sides of the planted seed which serve to protect the growing plants from severe winds, rain or drifting snow.

A further object is the provision of a device for this purpose, that may be adjustably secured on the shoe of any ordinary grain shoe drill and which shall be thoroughly efficient for the purpose devised.

To the attainment of the above broadly stated objects and others which will appear as the nature of the invention is better understood, reference is to be had to the drawings which accompany and form part of this application.

In the drawings:—

Figure 1:
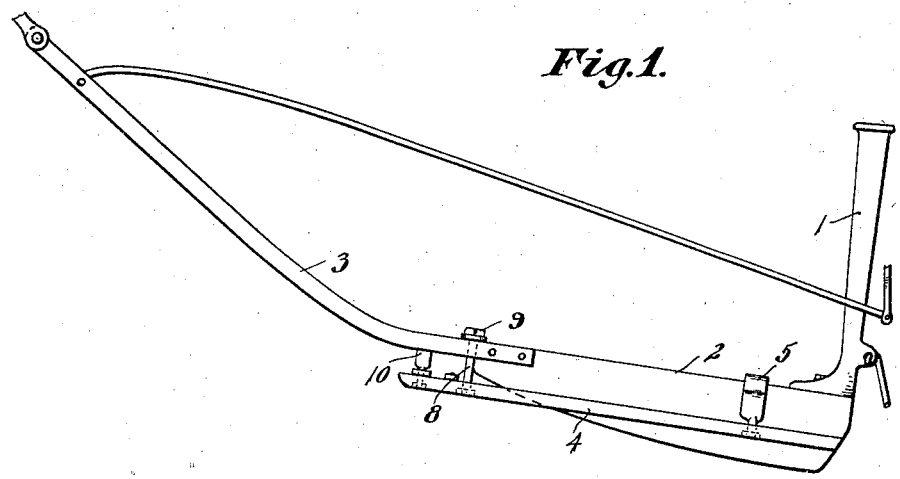
Figure 1 is a side elevation illustrating the application of the improvement on a shoe of a grain drill.
Figure 2:
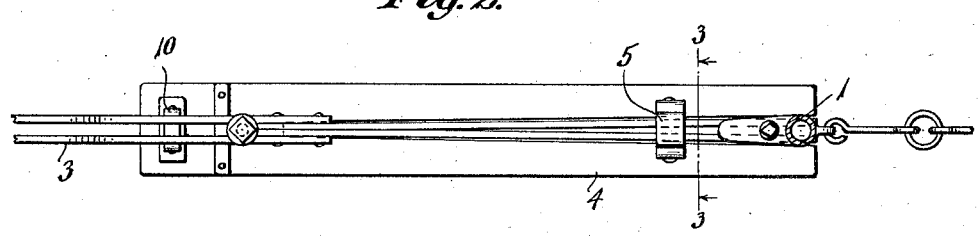
Figure 2 is a top plan view.
Figure 3:
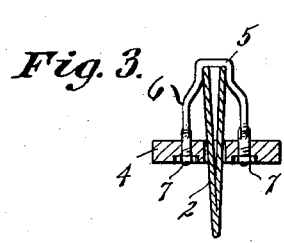
Figure 3 is a sectional view on the line 3—3 of Figure 2.
Figure 4:
Figure 4 is a perspective view of the attachment as seen when detached from the metal shoe in Figure 1.

Of course, the improvement is to be applied to all of the shoes of a grain drill, but for the purpose of illustration I have shown only one of such shoes.

Referring now to the drawings in detail, the numeral 1 designates the spout of a grain drill, 2 the shoe that supports the outlet of the spout thereon, and 3 the draw bars secured to the forward end of the shoe.

My improvement has its body portion formed of a flat plate 4. The plate may be of wood, metal, or any other desired material. The plate is slotted from its rear end to a point a suitable distance from its forward end, and in this slot the shoe 2 is received. The plate 4 is of a length greater than that of the shoe 2 and is provided on its upper face forward of the spout 1, with a preferably spring clip 5. The arms 6 of the clip are threaded and are engaged by nuts 7. The clip preferably exerts a pressure against the upper edge of the shoe 2 and by tightening or loosening the nuts 7 the plate 4 may be adjusted with respect to the lower or outer edge of the shoe.

Between the draw bars 3 there is passed a bolt 8, carried by the shoe, the said bolt being engaged by a nut 9 that contacts with a washer. This permits of the forward end of the plate 4 being adjusted on the shoe. In addition to this adjusting means I secure on the plate, adjacent to the forward end thereof, a substantially U-shaped bracket 10, the said bracket serving as a rest for the draw bars 3. The bracket is also preferably adjustably associated with the plate. When made of wood the plate 4 may be reinforced by transverse cleats, as disclosed by the drawings.

With my improvement it will be noted that the soft soil forward of the spout 1 will be compressed. The distance between the lower edge of the shoe and the plate may be nicely regulated so that the depth at which the seeds are planted may be thus properly determined. The gauge plate 4 prevents the scattering of the seed and serves to form ridges of soil at the opposite edges of the said plate. These ridges protect growing plants from winds or other weather inclemencies.

The attachment made of wood should be about twenty inches long; and about three and one-half inches wide, and the slot therein should be about (12) twelve inches long, and about three fourths inches wide at the rear end, and tapering to fit the side of the shoe. The lower edge of the shoe at the rear end about one inch below the plate.

After an extended use of a shoe drill equipped with my improvement as previously described and illustrated; it is found that by applying suitable pressure on the shoe in hard ground the seed can be placed at any required uniform depth: and when the shoe runs over soft or dry ground the seed will be placed in compressed moist soil at the same uniform depth and without any change of adjustment. A uniform depth of about one inch is found to be quite successful to secure quick and complete germination of grains and grass seeds.

Having described the invention, I claim:—

The combination with a drill shoe supporting a spout for a grain drill and having draw bars attached thereto, of a gauge plate thereon, comprising a member slotted from its rear end, for a determined distance to receive the shoe therein, a substantially U-shaped spring clamp straddling and frictionally engaging the side of the shoe, and having its arms passing through the plate, nuts screwed on said arms and let in the under face of the plate, a bolt member extending upwardly from the plate, passing through the draw bars, contacting with the forward end of the drill shoe and engaged by a nut, and an arched fulcrum member adjustably secured to the forward end of the plate, underlying and contacting with the draw bars.

In testimony whereof I affix my signature.

LUTHER E. FERGUSON.